(12) United States Patent
Zhu et al.

(10) Patent No.: US 11,522,377 B2
(45) Date of Patent: Dec. 6, 2022

(54) CUP HOLDER

(71) Applicant: DEWERTOKIN TECHNOLOGY GROUP CO., LTD, Jiaxing (CN)

(72) Inventors: Zhenjie Zhu, Jiaxing (CN); Baowei Xu, Jiaxing (CN); Long Li, Jiaxing (CN)

(73) Assignee: DEWERTOKIN TECHNOLOGY GROUP CO., LTD, Jiaxing (CN)

( * ) Notice: Subject to any disclaimer, the term of this patent is extended or adjusted under 35 U.S.C. 154(b) by 283 days.

(21) Appl. No.: 16/870,912

(22) Filed: May 9, 2020

(65) Prior Publication Data
US 2021/0028635 A1 Jan. 28, 2021

(30) Foreign Application Priority Data
Jul. 23, 2019 (CN) .......................... 201910666814.1

(51) Int. Cl.
| | |
|---|---|
| *H02J 7/00* | (2006.01) |
| *A47C 7/62* | (2006.01) |
| *B60N 3/10* | (2006.01) |
| *H02J 7/02* | (2016.01) |
| *A47C 1/12* | (2006.01) |

(52) U.S. Cl.
CPC ............ *H02J 7/0044* (2013.01); *A47C 7/622* (2018.08); *B60N 3/104* (2013.01); *H02J 7/02* (2013.01); *A47C 1/12* (2013.01)

(58) Field of Classification Search
CPC ...................................................... H02J 7/0044
USPC ..................................................... 297/188.01
See application file for complete search history.

(56) References Cited

U.S. PATENT DOCUMENTS

| | | | | |
|---|---|---|---|---|
| 2010/0078954 | A1* | 4/2010 | Liu ........................... | B60R 7/04 296/37.8 |
| 2011/0062916 | A1* | 3/2011 | Farahani ................. | H02J 50/20 320/108 |
| 2012/0235636 | A1* | 9/2012 | Partovi ................. | B60L 53/122 320/108 |
| 2017/0201115 | A1* | 7/2017 | Stickley ................. | H02J 7/0044 |
| 2019/0097448 | A1* | 3/2019 | Partovi ................... | H02J 50/40 |
| 2020/0361355 | A1* | 11/2020 | Chen ..................... | H02J 50/005 |

\* cited by examiner

*Primary Examiner* — Joseph Chang

(57) ABSTRACT

The present invention provides a cup holder. The cup holder includes a cup holder body having a receiving part and a charging assembly. The charging assembly includes a wireless charging module. The wireless charging module is mounted on the cup holder body and configured to charge a smart electronic device. The cup holder can charge the smart electronic devices, thereby improving user experience.

18 Claims, 6 Drawing Sheets

CUP HOLDER

CROSS-REFERENCE TO RELATED APPLICATIONS

The present disclosure claims priority to Chinese Patent Application No. 201910666814.1, filed with the Chinese Patent Office on Jul. 23, 2019, titled "A CUP HOLDER", the entire contents of which are incorporated herein by reference.

BACKGROUND

Technical Field

The present invention relates to a cup holder applied to vehicles, movie theaters, and furniture such as massage chairs, sofas or beds, and in particular, to a cup holder.

Related Art

Water cups or other objects are placed on the armrests of various seating device, thus it is convenient for people to perform various operations including drinking water and controlling the seating device while sitting for a long time. Most of typical cup holders have the functions of cooling, heating, massage control and so on. However, none of cup holders has a charging function of charging a smart electronic device, it affects the user experience.

SUMMARY

The present invention provides a cup holder capable of charging a smart electronic device to improve user experience.

The technical solution of the present invention is implemented as follows: A cup holder, including a cup holder body having a receiving part and a charging assembly, the charging assembly including a wireless charging module, the wireless charging module being mounted on the cup holder body and configured to charge a smart electronic device.

Further, the cup holder body further includes a smart electronic device container, a fixing plate is disposed on a sidewall of the smart electronic device container, and the wireless charging module is inserted onto the fixing plate and is disposed in close contact with the smart electronic device container.

Further, the smart electronic device container is disposed inclined relative to a horizontal plane where the cup holder body lies; and a protective casing respectively running through the receiving part and the smart electronic device container and fixed to the cup holder body is disposed below the cup holder body.

Further, the cup holder body further includes a vertically disposed and vertically liftable support assembly, and the wireless charging module is fixed to the support assembly.

Further, the support assembly includes a flipping plate on which the wireless charging module is mounted, a support frame with a coil spring, a pin shaft with a torsion spring, and a fastening base, where the flipping plate is hinged with the support frame by the pin shaft, one end of the torsion spring is connected to the flipping plate, the other end of the torsion spring is connected to the support frame, the support frame is provided with a fastening block configured to engage with the fastening base, the fastening base is provided with a locking chute, a fastening slot, and an unlocking chute, and the fastening block is movable along the locking chute and the unlocking chute to cooperate with the fastening slot to lock or unlock the support assembly.

Further, the support assembly further includes a damping assembly, and the damping assembly includes a damping gear fixed to the support frame and a spur rack engaged with the damping gear.

Further, the cup holder body is provided with a receiving slot for the support assembly to pass through, and a support rib configured to cooperate with the flipping plate to support the smart electronic device is disposed close to the receiving slot.

Further, the cup holder further includes a protective casing disposed below the cup holder body, running through the receiving part and fixed to the cup holder body.

Further, the protective casing includes a horizontally disposed transverse casing body and a vertical casing body vertically disposed downward from an end of the transverse casing body and having a chamber, a partition plate is vertically disposed in the chamber, the partition plate divides the chamber into a first chamber accommodating the support assembly and a second chamber receiving a cable, a fixing portion configured for mounting the fastening base thereto is disposed on a side wall of the first chamber, and the spur rack is disposed in the first chamber.

Further, the fixing portion includes a semicircular groove and a rectangular groove in communication with the semicircular groove, and two opposite hooking grooves are disposed in the semicircular groove.

In the cup holder provided in the present invention, the wireless charging module is used to charge the smart electronic device, and taking into consideration the safety during charging of the smart electronic device and the user's comfort, the cup holder body is provided with the smart electronic device container, so that the smart electronic device can be inserted in the smart electronic device container for charging, thereby preventing the smart electronic device from falling to the ground and being damaged. In addition, with the configuration of the liftable support assembly, when the user needs to use the device being charged, the user can press downward the support assembly, so that the support assembly is lifted up from the receiving slot. In this case, the smart electronic device is put on the flipping plate, and the support rib supports the smart electronic device. In this way, the user can use the device being charged, thereby improving user experience.

Figure 1:
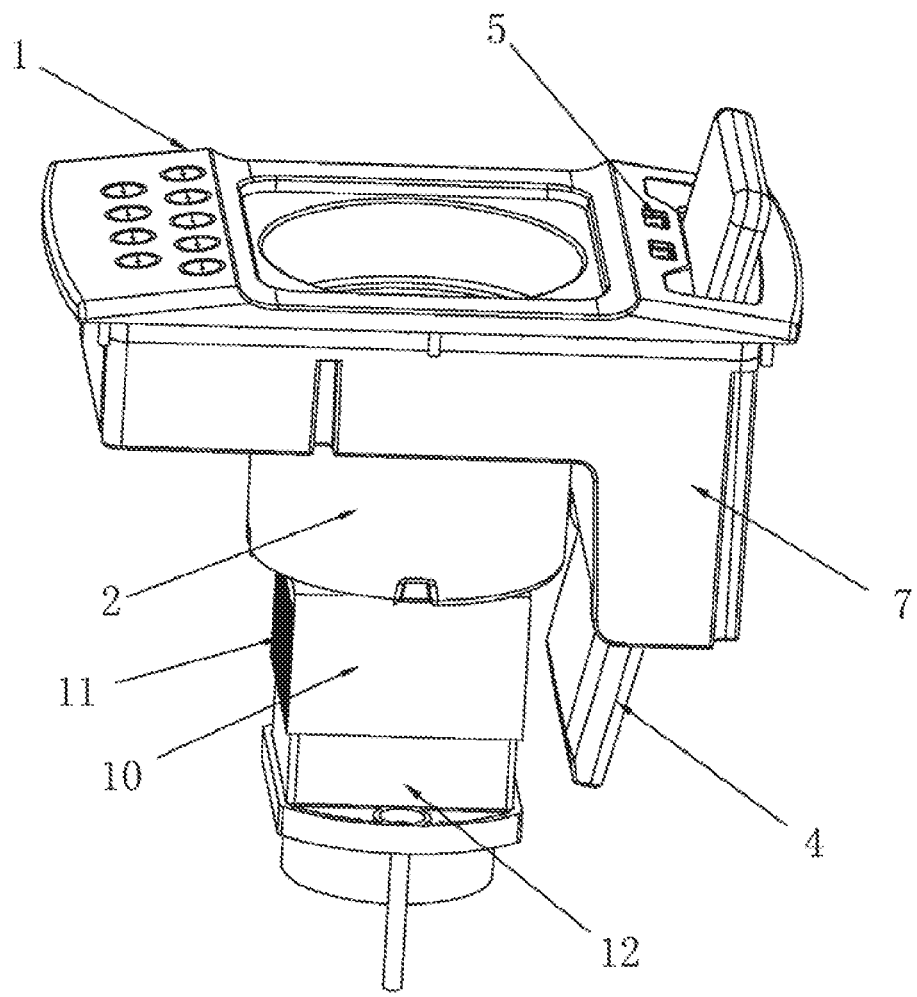
FIG. 1 is a structural schematic diagram of Embodiment 1 of the invention.

In the drawings: 1. cup holder body; 2. receiving part; 3. charging assembly; 4. intelligent electronic device container; 5. USB interface; 6. fixing plate; 7. protective casing; 8. bottom groove; 9. condensing sheet; 10. heat dissipation base; 11. heat dissipating sheet; 12. fan; 13. receiving slot; 14. transverse casing body; 15. vertical casing body; 16.

partition plate; 17. first chamber; 18. second chamber; 19. support assembly; 20. flipping plate; 21. coil spring; 22. support frame; 23. torsion spring; 24. pin shaft; 25. fastening base; 26. support rib; 27. fixing portion; 28. semicircular groove; 29. rectangular groove; 30. hooking groove; 31. hook; 32. fastening block; 33. locking chute; 34. fastening slot; 35. unlocking chute; 36. damping gear; 37. spur rack; and 38. wireless charging module.

DETAILED DESCRIPTION

The following clearly and completely describes the technical solutions in the embodiments of the present invention with reference to the accompanying drawings in the embodiments of the present invention.

Embodiment 1

Figure 2:
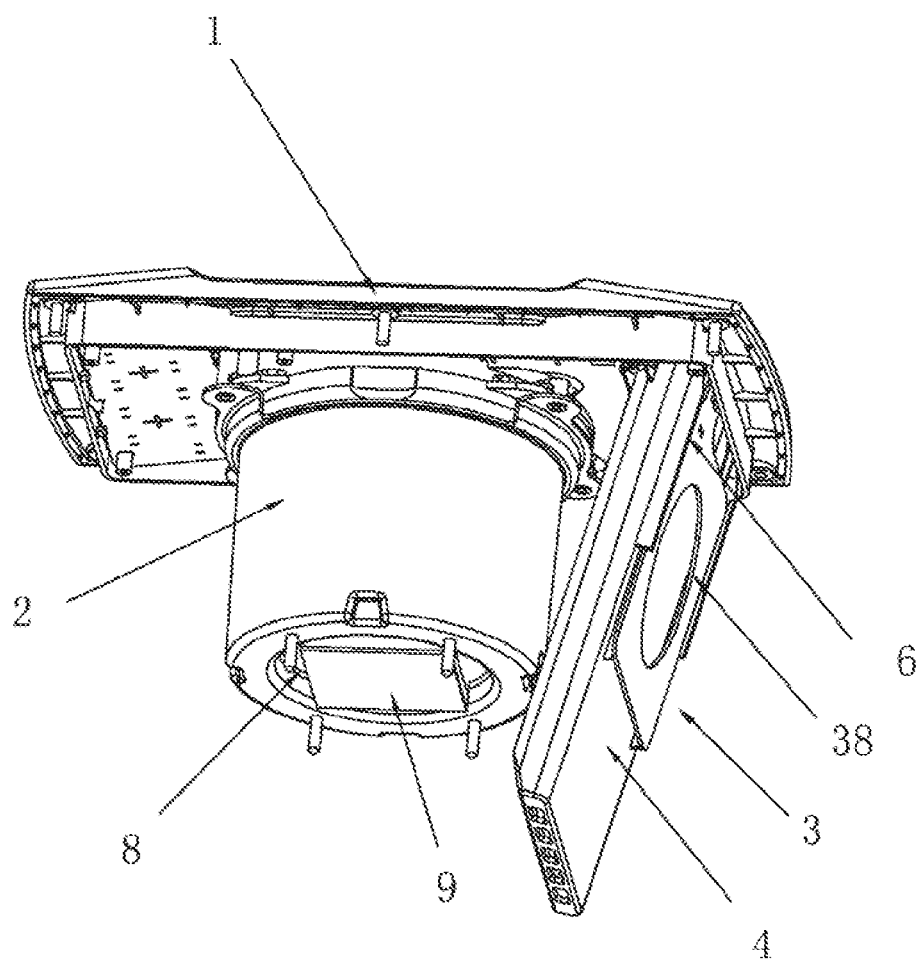
FIG. 2 is a local structural schematic diagram of Embodiment 1 of the invention.

Referring to FIG. 1 and FIG. 2, a cup holder includes a cup holder body 1 having a receiving part 2, and a charging assembly 3. The receiving part 2 is located in the middle of the cup holder body 1. On the cup holder body 1, various control buttons are disposed on a left side of the receiving part 2, and a universal serial bus (USB) interface 5 and a smart electronic device container 4 are disposed on a right side of the receiving part 2. The smart electronic device container 4 is disposed inclined relative to a horizontal plane where the cup holder body 1 lies.

The charging assembly 3 includes a wireless charging module. The wireless charging module is connected to an external power supply by a wire and is configured to charge a smart electronic device. Two opposite fixing plates 6 are disposed on a wall surface of the smart electronic device container 4. the smart electronic device is inserted onto the fixing plates 6 and disposed in close contact with the smart electronic device container 4, the smart electronic device container 4 is provided with a plurality of holes at the bottom thereof, to facilitate heat dissipation.

A protective casing 7 respectively running through the receiving part 2 and the smart electronic device container 4 and fixed to the cup holder body 1 is disposed below the cup holder body 1.

The receiving part 2 is in a circular shape. The receiving part 2 can accommodate a beverage can, a beverage bottle, or a water cup, and therefore can cool the beverage can, beverage bottle, or water cup, to satisfy different demands of users.

The receiving part 2 has a bottom groove 8 at the bottom thereof. A condensing sheet 9 is adhered in the bottom groove 8. The condensing sheet 9 may be an electronic condensing sheet 9 configured to control a surface connected to the receiving part 2 to be a cooling surface or a heating surface by controlling a current direction of a direct-current circuit. The condensing sheet 9 may alternatively be a semiconductor condensing sheet.

To dissipate heat from the bottom groove 8 and improve the cooling effect of the condensing sheet 9, the cup holder body 1 is provided with a heat dissipation base 10 at the bottom thereof. An upper surface of the heat dissipation base 10 is disposed in close contact with the electronic condensing sheet 9. An outer wall of the heat dissipation base 10 is provided with a plurality of heat dissipating sheets 11 to dissipate heat generated by the condensing sheet 9 in time.

A fan 12 is further mounted at the bottom of the heat dissipation base 10, to further improve the heat dissipation effect of the cup holder.

Embodiment 2

Embodiment 2 is different from Embodiment 1 in that, as referring to FIG. 3 to FIG. 6, the cup holder further includes a support assembly 19 and a protective casing 7 to allow the user to watch videos on the device being charged, thereby improving user experience. On the cup holder body 1, a receiving slot 13 is provided on a right side of the receiving part 2, and the support assembly 19 runs through the receiving slot 13 and is fixed to the cup holder body 1.

The protective casing 7 in this embodiment is different from the protective casing 7 in Embodiment 1. The protective casing 7 is disposed below the cup holder body 1, runs through the receiving part 2, and is fixed to the cup holder body 1. The protective casing 7 includes a horizontally disposed transverse casing body 14 and a vertical casing body 15 vertically disposed downward from an end of the transverse casing body 14 and having a chamber. A partition plate 16 is vertically disposed in the chamber, and the partition plate 16 divides the chamber into a first chamber 17 accommodating the support assembly 19 and a second chamber 18 receiving a cable.

Figure 3:
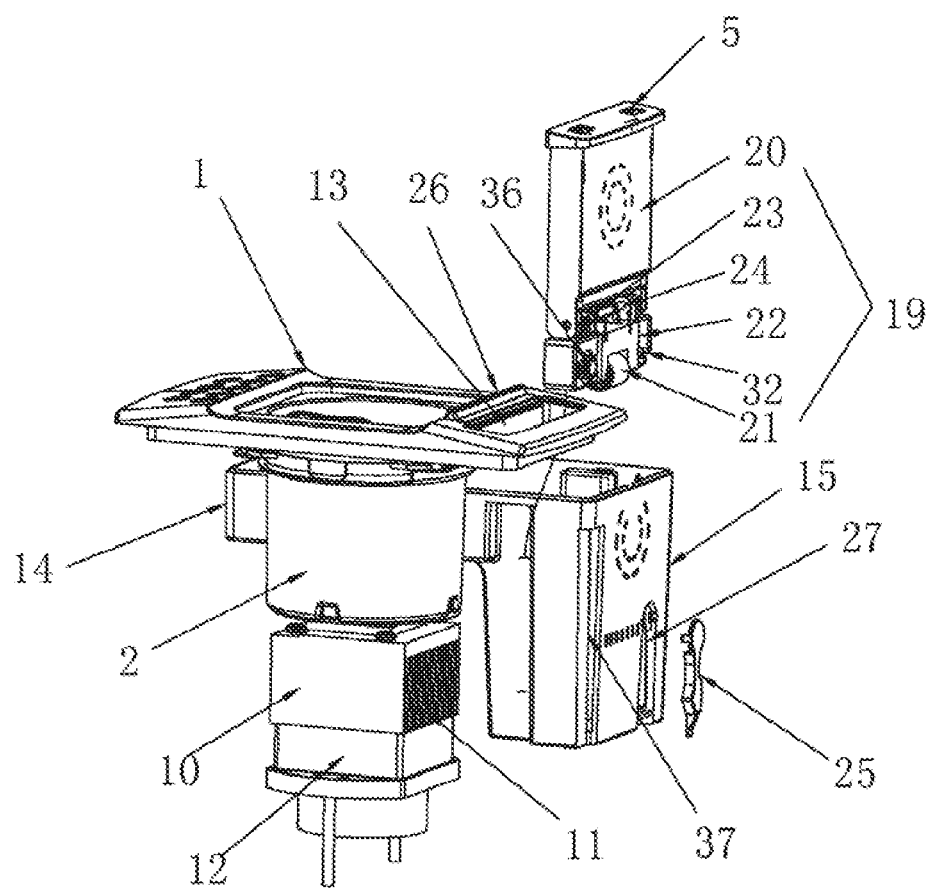
FIG. 3 is a structural schematic diagram of Embodiment 2 of the invention.
Figure 4:
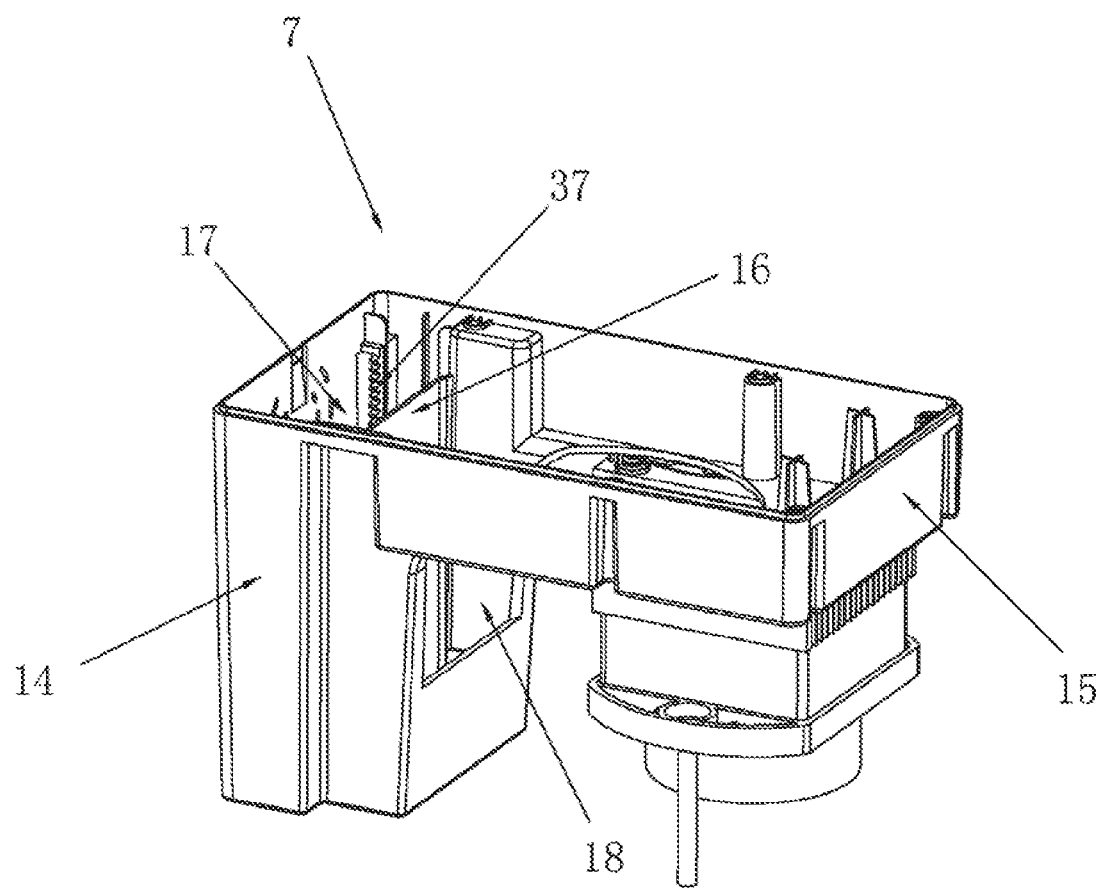
FIG. 4 is a structural schematic diagram of a protective casing according to Embodiment 2 of the invention.
Figure 5:
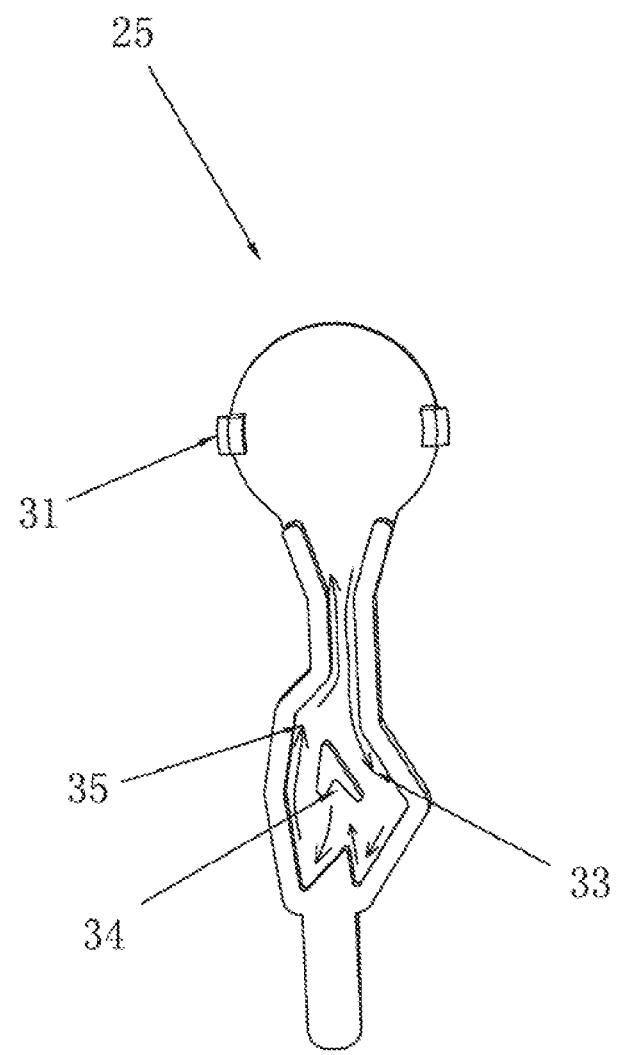
FIG. 5 is a structural schematic diagram of a fastening base according to Embodiment 2 of the invention.
Figure 6:
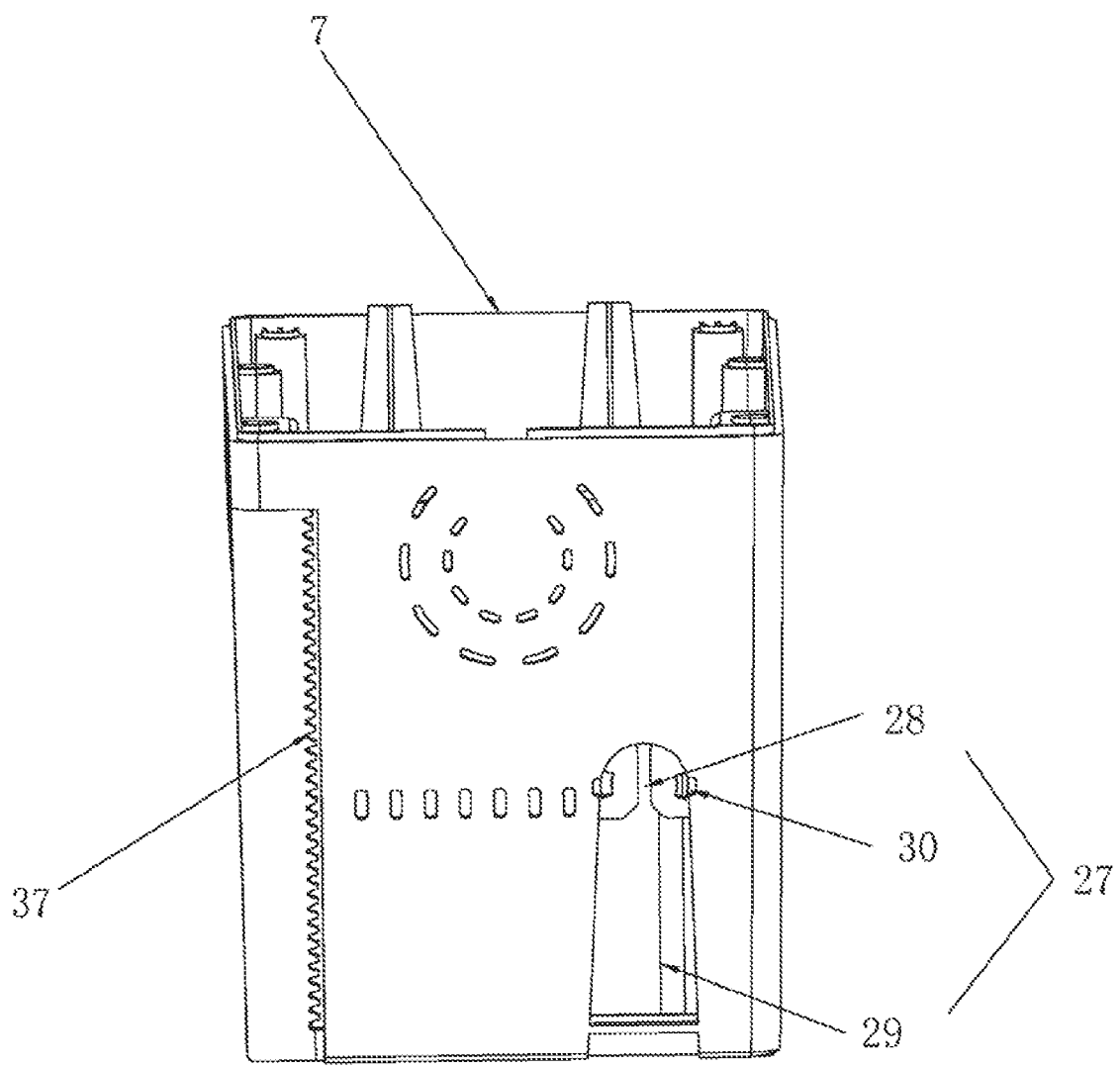
FIG. 6 is a schematic structural front view of the protective casing according to Embodiment 2 of the invention.

Referring to FIG. 3, the support assembly 19 includes a flipping plate 20, a support frame 22 with a coil spring 21, a pin shaft 24 with a torsion spring 23, and a fastening base 25. One end of the coil spring 21 is fixed to an inner wall of the first chamber 17. The flipping plate 20 is hinged with the support frame 22 by the pin shaft 24, one end of the torsion spring 23 is connected to the flipping plate 20, and the other end of the torsion spring 23 is connected to the support frame 22. The smart electronic device is placed on the flipping plate 20, and the flipping plate 20 rotates along the pin shaft 24 under the force of gravity of the electronic device. A support rib 26 is disposed close to the receiving slot 13 on the cup holder body 1 to prevent the smart electronic device from slipping. The wireless charging module is mounted on the flipping plate 20, and the smart electronic device is placed on the flipping plate 20, so that the user can watch videos on the device being charged.

A fixing portion 27 is disposed on a side wall of the first chamber 17. The fixing portion 27 includes a semicircular groove 28 and a rectangular groove 29 in communication with the semicircular groove 28. Two opposite hooking grooves 30 are disposed in the semicircular groove 28. A head portion of the fastening base 25 has two opposite hooks 31. The fastening base 25 is engaged with the hooking grooves 30 by means of the hooks 31 and is thus fixedly mounted on the fixing portion 27.

The support frame 22 is provided with a fastening block 32 configured to engage with the fastening base 25. The fastening base 25 is provided with a locking chute 33, a fastening slot 34, and an unlocking chute 35. When the user intends to use the wireless charging module for charging, the user presses downward the support assembly 19, and accordingly the support assembly 19 displaces downward to cause the fastening block 32 to depart from the fastening slot 34 and move upward along the unlocking chute 35, so that the support assembly 19 rises from the bottom up.

After the charging is finished, the user still presses downward the support assembly 19, and accordingly the support assembly 19 moves downward, and the fastening block 32 moves downward along the locking chute 33 to the fastening slot 34 and is thus engaged with the fastening slot 34. In this way, the support assembly 19 is locked.

To prevent the support assembly 19 from ejecting out of the cup holder to accidentally injure the user due to the elastic force of the coil spring 21 during unlocking, the support frame 22 is provided with a damping gear 36, a spur rack 37 is disposed on a side wall of the first chamber 17, and the damping gear 36 is engaged with the spur rack 37. When the support assembly 19 moves vertically, the damping gear 36 rotates along the spur rack 37.

A USB interface 5 is further disposed at the top of the flipping plate 20, allowing the user to charge the smart electronic device through a cable.

In the cup holder provided in the present invention, the wireless charging module is used to charge the smart electronic device, and taking into consideration the safety during charging of the smart electronic device and the user's comfort, the cup holder body 1 is provided with the smart electronic device container 4, so that the smart electronic device can be inserted in the smart electronic device container 4 for charging, thereby preventing the smart electronic device from falling to the ground and being damaged. In addition, with the configuration of the liftable support assembly 19, when the user needs to use the device being charged, the user can press downward the support assembly 19, so that the support assembly 19 is lifted up from the receiving slot. In this case, the smart electronic device is put on the flipping plate 20, and the support rib 26 supports the smart electronic device. In this way, the user can use the device being charged, thereby improving user experience.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A cup holder, comprising:
a cup holder body having a receiving part;
a charging assembly, comprising a wireless charging module, the wireless charging module being mounted on the cup holder body, and
a smart electronic receiving container configured to receive a smart electronic device, the electronic receiving container being located between the wireless charging module and the receiving part, and the smart electronic device received in the smart electronic receiving container being charged by the charging assembly,
wherein the cup holder body further comprises: a fixing plate disposed on a sidewall of the smart electronic device container, and the wireless charging module being fastened to the fixing plate and located away from the receiving part.

2. The cup holder according to claim 1, wherein the smart electronic device container is inclined relative to the cup holder body to enable the smart electronic device to abut against the smart electronic device container because of an gravity of the smart electronic device.

3. The cup holder according to claim 1, further comprising a protective casing surrounding the receiving part and the smart electronic device container, and the cup holder body being disposed below the cup holder body.

4. The cup holder according to claim 1, wherein the cup holder further comprises a support assembly, and the wireless charging module is fixed to the support assembly, the support assembly is capable of going up and down related to the cup holder body; the supporting assembly is capable of hiding in the cup holder body when going down in first position, and the support assembly locked in the cup holder body with a portion above the cup holder body when going up in a second position.

5. The cup holder according to claim 4, wherein the support assembly comprises a support frame having a fastening block, a flipping plate pivoted to the supporting frame and to secure the wireless charging module, and a fastening base, the fastening block is engaged with the fastening base to enable the supporting assembly locked in the cup holder or unlocked from the cup holder.

6. The cup holder according to claim 5, wherein the support assembly further comprises a coil spring, a pin shaft with a torsion spring, the flipping plate is hinged with the support frame by the pin shaft, one end of the torsion spring is connected to the flipping plate, the other end of the torsion spring is connected to the support frame.

7. The cup holder according to claim 5, wherein a locking chute, a fastening slot, and an unlocking chute are located in the fastening base, the fastening block is movable along the locking chute and the unlocking chute to cooperate with the fastening slot to lock or unlock the support assembly.

8. The cup holder according to claim 4, wherein the support assembly further comprises a damping assembly, and the damping assembly comprises a damping gear fixed to the support frame and a spur rack engaged with the damping gear.

9. The cup holder according to claim 8, wherein the cup holder body defines a receiving slot enabling the support assembly to pass through, and a support rib is located in the cup holder to cooperate with the flipping plate to support the smart electronic device is disposed close to the receiving slot.

10. A cup holder, comprising:
a cup holder body having a receiving part;
an electronic receiving container configured to receive the smart electronic device, and the electronic receiving container inclined downward from a bottom of cup holder body; and
a charging assembly comprising a wireless charging module mounted to the smart electronic receiving container, the charging assembly configured to charge a smart electronic device and to which an gravity of the smart electronic device receiving being applied to,
wherein the cup holder further comprises a support assembly, and the wireless charging module is fixed to the support assembly, the support assembly is capable going up and down related to the cup holder body, the supporting assembly is capable of hiding in the cup holder when going down in first position; the support assembly locked in the cup holder with a portion above the cup holder body when going up in a second position.

11. The cup holder according to claim 10, wherein the cup holder body further comprises: a fixing plate disposed on a sidewall of the smart electronic device container, and the wireless charging module being fastened to the fixing plate and located away from the receiving part.

12. The cup holder according to claim 11, further comprising a protective casing surrounding the receiving part and the smart electronic device container, and the cup holder body being disposed below the cup holder body.

13. The cup holder according to claim 10, wherein the support assembly comprises a support frame having a fastening block, a flipping plate pivoted to the supporting frame and to secure the wireless charging module, and a fastening base, the fastening block is engaged with the fastening base to enable the supporting assembly locked in the cup holder or unlocked from the cup holder.

14. The cup holder according to claim 13, wherein the support assembly further comprises a coil spring, a pin shaft with a torsion spring, the flipping plate is hinged with the support frame by the pin shaft, one end of the torsion spring is connected to the flipping plate, the other end of the torsion spring is connected to the support frame.

15. The cup holder according to claim 13, wherein a locking chute, a fastening slot, and an unlocking chute are located in the fastening base, the fastening block is movable along the locking chute and the unlocking chute to cooperate with the fastening slot to lock or unlock the support assembly.

16. The cup holder according to claim 13, wherein the support assembly further comprises a damping assembly, and the damping assembly comprises a damping gear fixed to the support frame and a spur rack engaged with the damping gear.

17. A seating device, comprising:
a main body,
a cup holder having a receiving part mounted to the main body; the cup holder comprising:
a charging assembly, the charging assembly comprising a wireless charging module, the wireless charging module being mounted on the cup holder body and configured to charge a smart electronic device,
and an electronic receiving container configured to receive the smart electronic device, and the electronic receiving container located between the wireless charging module and the receiving part,
wherein the cup holder body further comprises: a fixing plate disposed on a sidewall of the smart electronic device container, and the wireless charging module being fastened to the fixing plate and away from the receiving part.

18. The seating device according to claim 17, wherein the smart electronic device container is inclined relative to the cup holder body to enable the smart electronic device to abut against the smart electronic device container because of an gravity of the smart electronic device.

\* \* \* \* \*